Patented Aug. 26, 1952

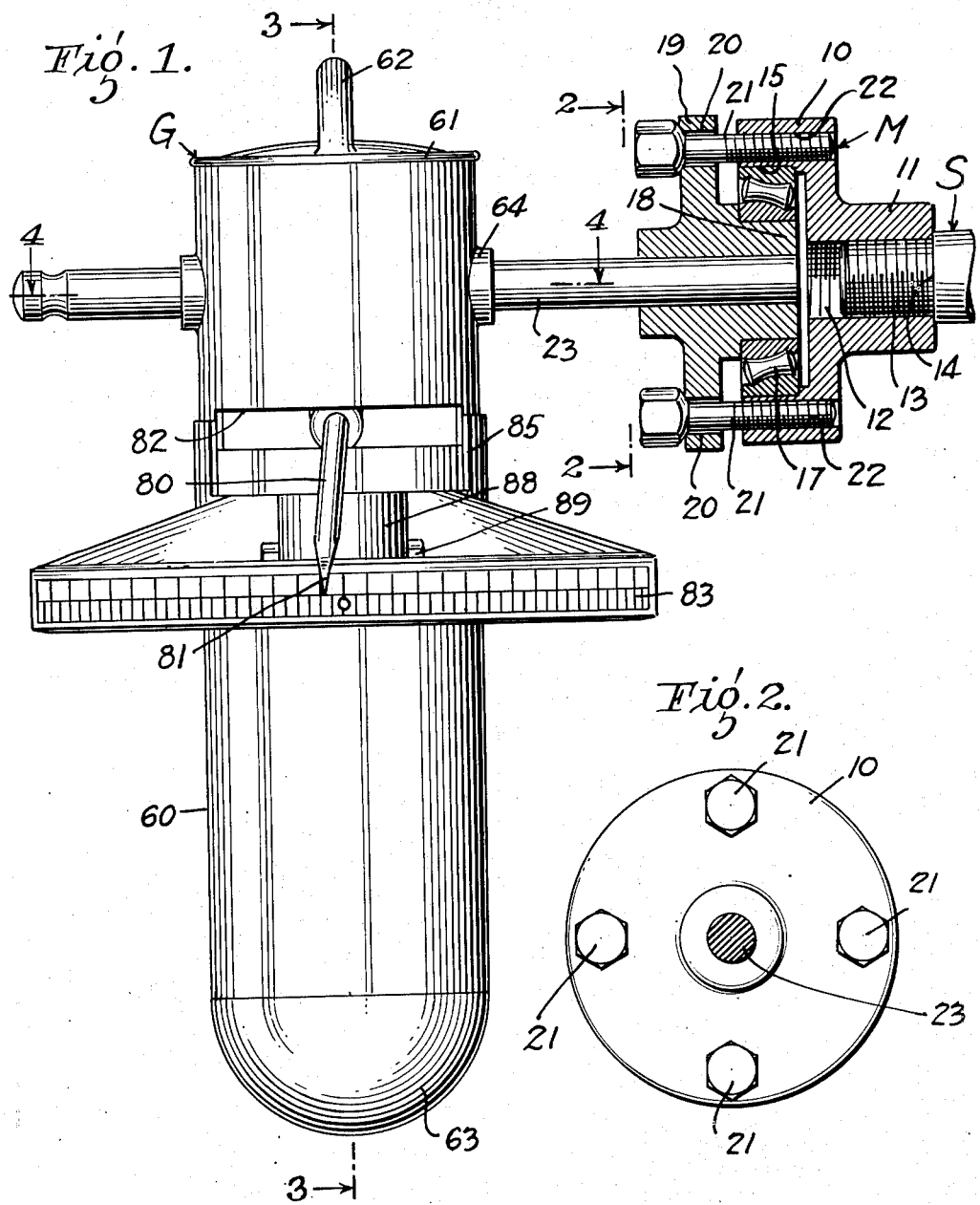

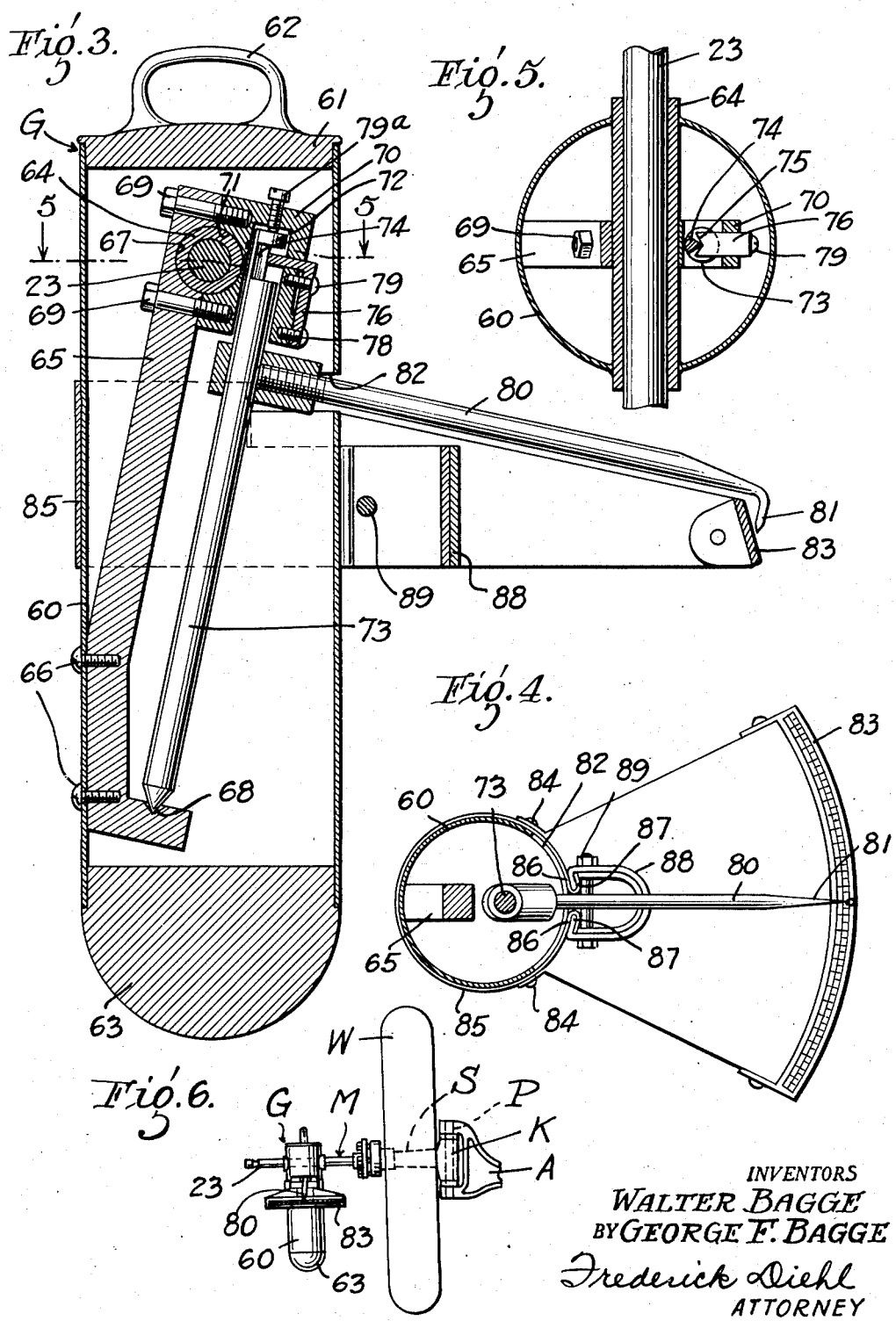

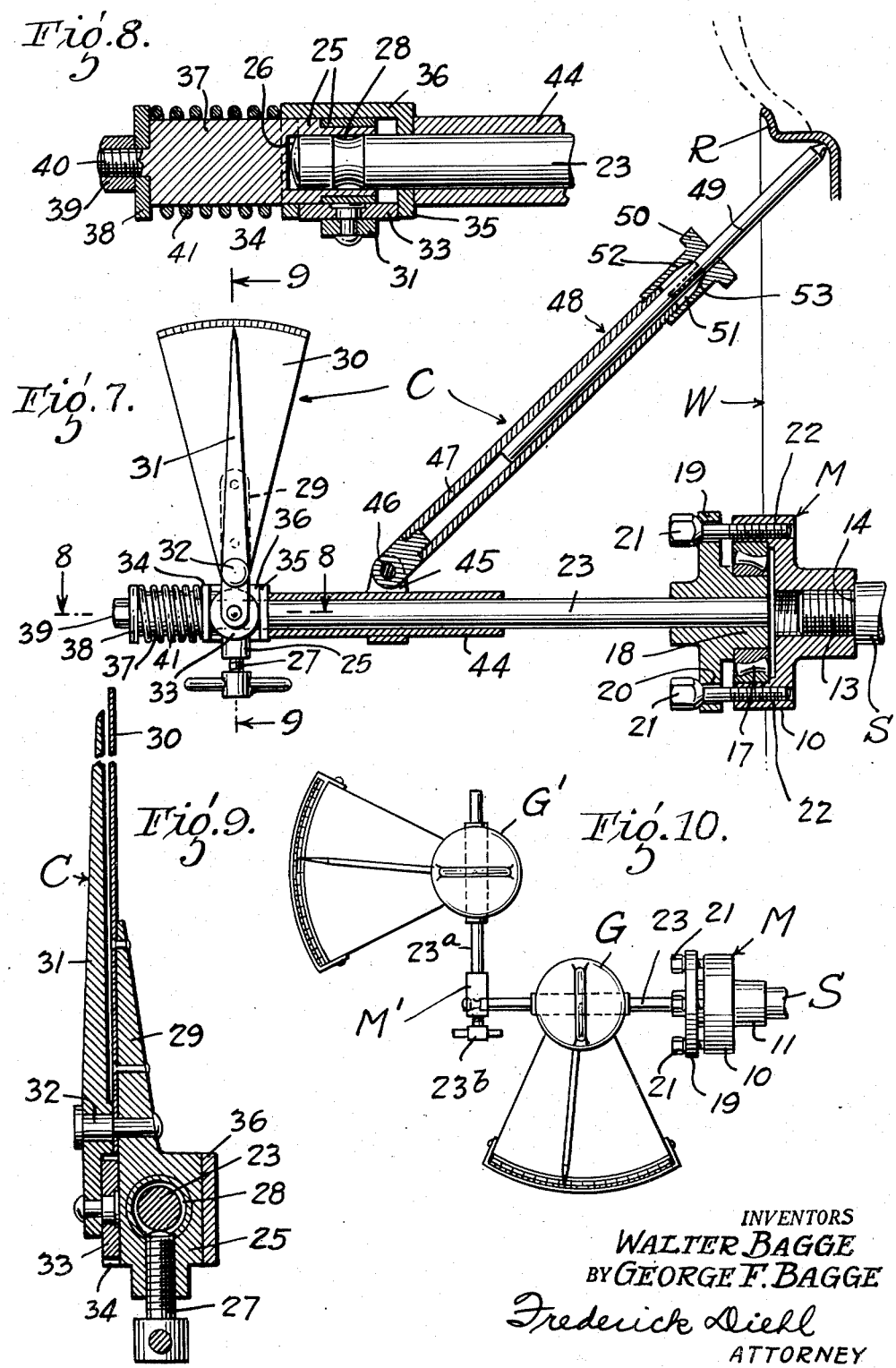

2,608,368

UNITED STATES PATENT OFFICE 2,608,368

WHEEL GAUGE MOUNTING

Walter Bagge and George F. Bagge,
Los Angeles, Calif.

Application July 6, 1946, Serial No. 681,679

2 Claims. (Cl. 248—200)

This invention relates to gaging instruments of the general character embodied in the United States Letters Patent of Walter Bagge, No. 1,804,490, issued May 12, 1931, and wherein is disclosed and claimed a wheel gage for determining the camber and caster of vehicle front wheels by an accurate indication regardless of whether a wheel is running true or not, with the manner of association of the wheel gage with the wheel being such as to permit various adjustments such as bending or twisting the axle to correct inaccurate camber or caster, to be made while the gage is applied and is accurately indicating the camber and caster of the wheels during the adjusting operation.

The invention as above described also includes a mounting device by which the gage is adapted to be rigidly supported from the wheel spindle so that the latter rather than the wheel will be employed as the basis for camber and caster measurements.

An object of the present invention is to provide a wheel gage and a mounting device therefor, which are characterized by a mechanically simplified and compact structure capable of performing all the functions of the invention of the patent above identified, while retaining all the former advantages, and in addition are more rugged for heavy duty and prolonged service without maintenance cost; are most easily applied and manipulated, with the gage being accurately readable most conveniently, and the mounting device being readily adaptable to wheel spindles of different sizes to rigidly support the gage upon an axis in alinement with the spindle axis.

A further object of this invention is to provide a setting or centering gage adapted to be operatively associated with the gage mounting device for co-action therewith and with the wheel rim, to indicate what adjustment, if any, of the mounting device on the wheel spindle, is necessary to establish alinement between the gage supporting axis of the mounting device and the wheel spindle, in order to insure accurate camber and caster indications by the wheel gage.

With these and other objects in view, the invention resides in the combinations, arrangements and functional relationships of elements as set forth in the following specification and particularly pointed out in the appended claims.

In the accompanying drawings,

Figure 1 is a view showing in front elevation, partly in section, one form of wheel gage embodying this invention, applied to the spindle of a vehicle wheel;

Figure 2 is a detail sectional view taken on the line 2—2 of Figure 1;

Figure 3 is a vertical axial sectional view of the wheel gage, taken on the line 3—3 of Figure 1;

Figure 4 is a plan sectional view taken on the line 4—4 of Figure 1;

Figure 5 is a detail sectional view taken on the line 5—5 of Figure 3;

Figure 6 is a reduced scale view in front elevation, showing a front wheel assembly with the wheel gage embodying this invention applied to the wheel spindle;

Figure 7 is a vertical axial sectional view illustrating the centering gage and gage mounting device applied to a vehicle wheel;

Figure 8 is an enlarged fragmentary plan sectional view taken on the line 8—8 of Figure 7;

Figure 9 is an enlarged vertical transverse sectional view taken on the line 9—9 of Figure 7; and Figure 10 is a reduced scale plan view illustrating two wheel gages and a form of gage mounting device enabling the gages to be concurrently used to respectively indicate the camber and caster of a vehicle wheel.

Referring specifically to the drawings, the invention in its illustrated embodiment comprises a wheel gage G; a gage mounting device M therefor; and a centering gage C, the mounting device M being adapted to support the gage G on the spindle S of a vehicle wheel W (Figure 6), which spindle forms part of a steering knuckle K rotatably mounted on a king pin P journaled in the bifurcated end of the axle A of the vehicle, as is well known in the art.

The gage mounting device M is composed of an adapter member or flange 10 having a hub 11 provided with a threaded bore 12 enabling the member to be screwed onto the reduced threaded end 13 of the wheel spindle S to abut the annular shoulder 14 of the spindle. Several of the flanges 10 may be provided with threaded bores 12 to fit the spindle threads 13 of different diameters and pitches so as to enable the mounting device M to be applied to such spindles with a minimum number of the flanges 10.

The flange 10 has an annular recess 15 adapted to receive the outer race of a conventional type of self-alining bearing 17, the inner race of which is fixed on the hub 18 of a head 19 provided with a circular series of openings 20 freely receiving the threaded shanks of adjusting cap screws 21 screwed into threaded bores 22 in the flange 10. Projecting rigidly and axially from the hub 18 is a gage-mounting extension in the form of a round shaft 23. By means of the screws 21, the shaft 23 can be angularly adjusted in any direction throughout 360 degrees about the bearing 17 which broadly constitutes a ball-and-socket or knuckle joint connection between the adapter member 10 and the shaft 23, all to the end of enabling the shaft to be disposed and locked in axial alinement with the axis of the wheel spindle S.

In order to facilitate centering of the mounting device M on the wheel spindle S, the centering gage C shown in Figures 7, 8 and 9 is employed. This gage comprises an indicator composed of a support 25 having a socket 26 slidably receiving the outer end of the shaft 23 and adapted to be rigidly secured to the shaft by means of a clamping screw 27 threaded through the support and adapted to seat in an annular groove 28 formed in the shaft. The support includes a rigid extension 29 to which is fixed a graduated dial 30 with which co-acts an indicating arm 31 pivotally mounted on the support by a pin 32, and carrying a rotatably mounted roller 33 at its end opposite to the indicating end of the arm.

The roller 33 is disposed between the two spaced ears 34 and 35 of a U-shaped slide 36 slidably mounted on the axial extension 37 of the support 25 and receiving the shaft 23. A stop washer 38 is secured by a nut 39 on the reduced and threaded end 40 of the extension 37, and provides an abutment for one end of a coil spring 41 mounted on the extension 37. The other end of the spring 41 bears against the slide 36 to urge the latter axially in one direction, which, in the applied position of the indicator, is towards the spindle S, for co-action with the roller 33 in moving the indicating arm 31 in one direction over the dial 30.

The centering gage C includes an actuator for the above described indicator, which comprises a bearing member in the form of a sleeve 44 adapted to be rotatably mounted and axially slidable on the shaft 23 between the slide 36 and the head 19 of the gage mounting device M. The sleeve 44 has laterally projecting ears 45 on which is pivotally mounted by means of a pin 46, one end of the tubular section 47 of an extensible arm 48, the other rod section 49 of which is telescopically received in the section 47 and has its outer end pointed for engagement with the tire rim R (Figure 7).

The outer end of the arm section 47 is threaded to receive a nut 50 which is mounted on the rod section 49. The outer end of the section 47 is also split longitudinally at 51 to render it constrictable, and its periphery is beveled to provide an annular wedge cam 52 on which the complementarily beveled annular cam surface 53 on the nut 50 rides when the nut is screwed onto the section 47, all to the end of clamping the sections 47 and 49 in a selected position of relative axial adjustment.

With the actuator and indicator of the centering gage C applied to the shaft 23 as shown in Figure 7, the arm 48 is adjusted against the rim R until the slide 36 has been moved axially against the spring 41 to center the indicating arm 31 on the dial 30. With the arm 48 locked in this adjusted position by the nut 50, the wheel W is rotated, thus rotating the arm 48 and the sleeve 44 with it. Should the shaft 23 not be in axial alinement with the wheel spindle S, this fact will be indicated by a back and forth swinging of the indicating arm 31 over the dial 30 first to one side and then to the other of the mid position. Suitable adjustment of the screws 21 is now made until the indicating arm 21 remains stationary as the wheel is rotated, to thus indicate perfect alinement between the axis of the shaft 23 and the axis of the spindle S.

The centering gage may now be removed in its entirety from the shaft 23 for use of the wheel gage G which comprises a support in the form of a cylindrical housing 60, the upper end of which is closed by a cap 61 having a handle 62, and the lower end of which is closed by a weight 63. A bearing sleeve 64 having an inner diameter to slidably receive the shaft 23, extends diametrically through the housing 60 adjacent to its upper end and is welded or otherwise rigidly secured thereto. A bracket 65 is rigidly secured by screws 66 within the housing 60 and has a half round recess 67 receiving a corresponding part of the sleeve 64. The lower end of the bracket 65 is provided with a conical end thrust bearing 68, whereas its upper end has secured thereto by cap screws 69 at opposite sides of the bearing sleeve, a holder 70. The holder 70 has a half round recess 71 receiving the remaining half of the sleeve, and is provided with a socket 72 freely receiving the upper end of a rock shaft 73, the lower end of which is conical and rests in the bearing 68 to support the weight of the shaft 73 in the inclined position from the perpendicular at which the housing is maintained by the weight 63 when the bearing sleeve 64 is mounted on the shaft 23.

The upper end of the shaft 73 is recessed laterally to provide a knife edge 74, which, under the weight of the shaft as inclined, seats against a V-shaped bearing 75 on one arm of an L-shaped bearing member 76, the other arm of which is secured to the holder 70 by a screw 78. A second screw 79 threaded into the holder 70, enables the bearing member 76 to be adjusted to center the upper end of the shaft 73 in the socket 72 and thus reduce friction of the shaft to a minimum. An end thrust screw 79a is also threaded into the holder 70 for adjustment sufficiently close to the upper end of the shaft 73 to prevent axial displacement of the shaft from the bearing 68.

An indicating member 80 in the form of an arm having a laterally projecting pointer 81 at one end, is rigidly secured at its other end to the rock shaft 73, and extends therefrom at a right angle, freely through a circumferential slot 82 in the housing 60 for co-action of the pointer 81 with the graduations of an arcuate dial 83. The dial 83 is secured at 84 to a split clamping strap 85 receiving the housing 60 and having its ends return-bent at 86 to receive lugs 87 on the ends of a U-shaped actuator 88 through which extends a clamping bolt 89 enabling force to be applied to the actuator to draw the strap 85 into the firm clamping engagement with the housing following circumferential adjustment of the dial 83 to locate the pointer 81 at the zero graduation of the dial when the housing is suspended freely in its perpendicular position under the influence of the weight 63, which latter, it will be understood, has a preponderance of mass to completely nullify the unbalancing effect of the laterally projecting indicating arm 80 and dial 83.

The operation of the invention is as follows:

With the gage mounting device M applied to the wheel spindle S and centered thereon, the housing 60 swings about the axis of the spindle S in the manner of a plumb bob, and comes to rest under the influence of the weight 63 as shown in Figure 3.

With the wheel W in straight-ahead steering position, any positive or negative camber of the spindle S will manifest itself by movement of the indicating arm 80 sufficiently from the zero indication of the dial 83 to compensate for the tilted position occupied by the housing in accordance with the camber angle of the spindle, it being clear that the weight of the laterally extending indicating arm 80 and the mounting of the supporting shaft 73 of the arm about an axis inclined from the perpendicular, will produce an unbalanced condition when the housing 60 is tilted by any existing camber. The mass of the indicating arm and its shaft becomes balanced again when moved through an angle corresponding to the camber angle, which latter will be indicated on the dial 83.

To determine the caster of the wheel, steering movement of the wheel from one extreme position to the other is effected. Should caster exist, the housing 60 will swing about the axis of the shaft 23 during such steering movement of the wheel, which will react upon the indicating arm 80 by causing the latter to move in one direction and then the other. The operator notes the position of the pointer 81 on the dial 83 in both extreme positions of the arm 80, and will determine the amount of caster by the difference between the two readings.

Should no caster be present, the arm 80 will remain stationary with respect to the dial 83 during steering movement of the wheel, and will constantly indicate the amount of camber present in the wheel. It will be understood that in practice, two gages G and two mounting devices M may be provided to enable both wheels W to be tested at one time if desired, and any required adjustment made from a consideration of both gages.

In most modern automobiles, the camber and caster adjustments are concurrently effected by a single operation of an eccentric mechanism, so that it is most desirable to provide in addition to the above described gage mounting M, for the one wheel gage G, a second gage mounting device M' for the second gage G' as illustrated in Figure 10. The second mounting device M' is merely a shaft 23a rigidly secured by a set screw 23b to the outer end of the shaft 23 at a right angle thereto, so as to support the two gages in right angular relation as viewed in plan. With this combination mounting, the camber will be indicated by the gage G, and the caster by the gage G', as a result of the mode of operation above described.

It will be understood that should no caster exist, the angle which the axis of the shaft 23a makes with the horizontal, will remain constant during steering movement of the wheel from extreme right to extreme left position, and that any camber present will be constantly indicated by the gage G during such movements of the wheel. However, should caster be present, the relative angle between the axis of the shaft 23a and the horizontal will vary accordingly as steering movement of the wheel is effected, with attending movement of the pointer 81 on the dial 83 of the gage G'. Therefore, it is only necessary for the operator to note the readings of the pointer 81 on the dial 83 of the gage G' at the extreme steered positions of the wheel, and then obtain the caster from the difference between the two readings.

Although the term "axle" has been used in connection with the wheel spindles, this expression is to be broadly construed in the specification and claims as including the present front end suspension or independent spring of the wheels from the chassis frame. Also, the term "spindles" is to be similarly broadly construed to include the live axles of the rear or driving wheels, as the gage mounting device M may also be applied to such axles in testing for a bent condition of the rear axle housing.

We claim:

1. In a wheel gage, a mounting device therefor comprising: a head having an axially projecting shaft upon which the gage is adapted to be mounted; an adapter member having a threaded bore by which the member is adapted to be rigidly secured on the threaded portion of a wheel spindle; an angularly adjustable connection between the head and adapter member by which said adjustment of the head about a center coincident with the spindle axis can be effected to establish an alined condition between such axis and the axis of said shaft; and a plurality of spaced fastening members threadedly connecting the head and adapter member at such circumferentially spaced intervals as to enable the aforesaid adjustment of the head to be effected by manipulating the fastening members.

2. In a wheel gage, a mounting device therefor comprising: a head having a hub and a gage-supporting shaft projecting axially from the hub; a flange having an annular recess and a hub provided with a threaded bore to receive the threaded portion of a wheel spindle; a self alining bearing having its inner race mounted on the hub of said head, and its outer race received in said recess of the flange to provide for angular adjustment between the head and flange; and a plurality of screws threadedly connecting the head and flange at circumferentially spaced intervals.

WALTER BAGGE.
GEORGE F. BAGGE.

REFERENCES CITED

The following references are of record in the file of this patent:

UNITED STATES PATENTS

| Number | Name | Date |
|---|---|---|
| 1,804,490 | Bagge | May 12, 1931 |
| 1,910,926 | Lutz | May 23, 1933 |
| 1,927,488 | Christensen et al. | Sept. 19, 1933 |
| 2,066,699 | Skelton | Jan. 5, 1937 |
| 2,073,089 | Autenreith | Mar. 9, 1937 |
| 2,077,082 | Wedlake | Apr. 13, 1937 |
| 2,082,390 | Gibbons | June 1, 1937 |
| 2,132,172 | Langsner | Oct. 4, 1938 |
| 2,176,357 | Palmer | Oct. 17, 1939 |
| 2,354,046 | Oslund | July 18, 1944 |
| 2,438,358 | Castiglia | Mar. 23, 1948 |